(12) United States Patent
Rieke et al.

(10) Patent No.: US 8,945,368 B2
(45) Date of Patent: Feb. 3, 2015

(54) SEPARATION AND/OR SEQUESTRATION APPARATUS AND METHODS

(71) Applicant: Battelle Memorial Institute, Richland, WA (US)

(72) Inventors: Peter C. Rieke, Richland, WA (US); Silas A. Towne, Richland, WA (US); Greg W. Coffey, Richland, WA (US); Aaron M. Appel, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/748,463

(22) Filed: Jan. 23, 2013

(65) Prior Publication Data

US 2013/0186775 A1 Jul. 25, 2013

Related U.S. Application Data

(60) Provisional application No. 61/589,704, filed on Jan. 23, 2012.

(51) Int. Cl.
*B01D 19/00* (2006.01)
*B01D 53/96* (2006.01)
(Continued)

(52) U.S. Cl.
CPC ........ *B01D 19/0073* (2013.01); *B01D 53/1425* (2013.01); *B01D 53/1475* (2013.01); *B01D 53/965* (2013.01); *Y02C 10/06* (2013.01)
USPC ......... 205/555; 204/234; 204/275.1; 205/349

(58) Field of Classification Search
CPC ........... B01D 19/0073; B01D 19/0084; B01D 53/1475; B01D 53/965; B01D 2257/504; B01D 53/326
USPC ................... 204/234, 275.1, 277, 278, 278.5; 205/687, 349, 555
See application file for complete search history.

(56) References Cited

U.S. PATENT DOCUMENTS 2,686,153 A * 8/1954 Hoenes .......................... 204/278
2,726,930 A 12/1955 Edwards et al.
(Continued)

FOREIGN PATENT DOCUMENTS

EP 0 658 366 6/1995
EP 0 671 201 11/1999
(Continued)

OTHER PUBLICATIONS

PCT/US2013/022794 Seach Rep., Mar. 28, 2013, Battelle Memorial Institute.
(Continued)

*Primary Examiner* — Keith Hendricks
*Assistant Examiner* — Steven A. Friday
(74) *Attorney, Agent, or Firm* — Wells St. John P.S.

(57) ABSTRACT

Apparatus for separating $CO_2$ from an electrolyte solution are provided. Example apparatus can include: a vessel defining an interior volume and configured to house an electrolyte solution; an input conduit in fluid communication with the interior volume; an output conduit in fluid communication with the interior volume; an exhaust conduit in fluid communication with the interior volume; and an anode located within the interior volume. Other example apparatus can include: an elongated vessel having two regions; an input conduit extending outwardly from the one region; an output conduit extending outwardly from the other region; an exhaust conduit in fluid communication with the one region; and an anode located within the one region. Methods for separating $CO_2$ from an electrolyte solution are provided. Example methods can include: providing a $CO_2$ rich electrolyte solution to a vessel containing an anode; and distributing hydrogen from the anode to acidify the electrolyte solution.

18 Claims, 9 Drawing Sheets

(51) Int. Cl.
  *B01D 53/32* (2006.01)
  *B01D 53/14* (2006.01)

(56) References Cited

U.S. PATENT DOCUMENTS

| | | | |
|---|---|---|---|
| 2,841,543 A * | 7/1958 | Haller | 205/432 |
| 3,165,460 A | 1/1965 | Zang et al. | |
| 3,344,050 A * | 9/1967 | Mayland et al. | 205/555 |
| 3,515,513 A | 6/1970 | Parsl | |
| 3,519,488 A | 7/1970 | Giner | |
| 5,064,733 A | 11/1991 | Krist et al. | |
| 5,079,103 A | 1/1992 | Schramm | |
| 5,134,043 A | 7/1992 | Nakazawa | |
| 5,141,620 A | 8/1992 | Molter | |
| 5,198,311 A | 3/1993 | Nakazawa et al. | |
| 5,208,113 A | 5/1993 | Kinoshita | |
| 5,215,728 A | 6/1993 | McManus | |
| 5,232,793 A | 8/1993 | Miyauchi et al. | |
| 5,246,551 A | 9/1993 | Pletcher et al. | |
| 5,284,556 A | 2/1994 | Rich | |
| 5,320,816 A | 6/1994 | Tsai et al. | |
| 5,344,529 A | 9/1994 | Stauffer | |
| 5,401,372 A | 3/1995 | Liu et al. | |
| 5,429,886 A | 7/1995 | Struthers | |
| 5,433,934 A | 7/1995 | Chang et al. | |
| 5,456,807 A | 10/1995 | Wachsman | |
| 5,512,144 A | 4/1996 | Stauffer | |
| 5,593,552 A | 1/1997 | Joshi et al. | |
| 5,616,430 A | 4/1997 | Aoyama | |
| 5,622,681 A | 4/1997 | Grierson et al. | |
| 5,648,054 A | 7/1997 | DeBerry | |
| 5,736,023 A | 4/1998 | Gallagher et al. | |
| 5,770,785 A | 6/1998 | Tamura et al. | |
| 5,807,526 A | 9/1998 | Miljevic | |
| 5,832,712 A | 11/1998 | Ronning et al. | |
| 5,840,174 A | 11/1998 | Lehmann et al. | |
| 6,004,445 A | 12/1999 | Genders et al. | |
| 6,051,677 A | 4/2000 | Maeda et al. | |
| 6,093,380 A | 7/2000 | Lagana et al. | |
| 6,187,465 B1 | 2/2001 | Galloway | |
| 6,331,232 B1 | 12/2001 | Lundgren et al. | |
| 6,517,794 B2 | 2/2003 | Gieshoff et al. | |
| 6,537,514 B1 | 3/2003 | Prasad et al. | |
| 6,566,003 B2 | 5/2003 | Acker | |
| 6,645,655 B1 | 11/2003 | McNamee et al. | |
| 6,808,838 B1 | 10/2004 | Wilson | |
| 6,818,107 B2 | 11/2004 | Awano et al. | |
| 6,984,372 B2 | 1/2006 | Randhava et al. | |
| 7,132,183 B2 | 11/2006 | Galloway | |
| 7,220,502 B2 | 5/2007 | Galloway | |
| 7,378,068 B2 | 5/2008 | Mao et al. | |
| 7,387,719 B2 | 6/2008 | Carson et al. | |
| 7,387,849 B2 | 6/2008 | Keefer et al. | |
| 7,396,440 B2 | 7/2008 | Amendola | |
| 7,479,215 B2 | 1/2009 | Carson et al. | |
| 7,517,445 B2 | 4/2009 | Carson et al. | |
| 7,520,916 B2 | 4/2009 | McElroy et al. | |
| 7,521,031 B2 | 4/2009 | Okubo et al. | |
| 7,527,770 B2 | 5/2009 | Monzyk et al. | |
| 7,531,080 B2 | 5/2009 | Carson et al. | |
| 7,531,708 B2 | 5/2009 | Carson et al. | |
| 7,611,620 B2 | 11/2009 | Carson et al. | |
| 7,691,251 B2 | 4/2010 | Carson et al. | |
| 7,753,973 B2 | 7/2010 | Galloway | |
| 7,795,175 B2 | 9/2010 | Olah et al. | |
| 7,807,040 B2 | 10/2010 | Legg et al. | |
| 7,828,883 B2 | 11/2010 | Aines et al. | |
| 7,871,508 B2 | 1/2011 | Carson et al. | |
| 7,883,610 B2 | 2/2011 | Monzyk et al. | |
| 2002/0121093 A1 | 9/2002 | Wallace et al. | |
| 2002/0142196 A1 | 10/2002 | Finkelshatin et al. | |
| 2003/0022035 A1 | 1/2003 | Galloway | |
| 2003/0027023 A1 | 2/2003 | Dutil et al. | |
| 2003/0129469 A1 | 7/2003 | Sun et al. | |
| 2003/0138677 A1 | 7/2003 | Preidel | |
| 2003/0143449 A1 | 7/2003 | Hunik | |
| 2003/0152818 A1 | 8/2003 | Preidel | |
| 2004/0213732 A1 | 10/2004 | Lightner | |
| 2004/0265680 A1 | 12/2004 | Ren et al. | |
| 2005/0016871 A1 | 1/2005 | Compton et al. | |
| 2005/0112423 A1 | 5/2005 | Omoto et al. | |
| 2006/0024539 A1 | 2/2006 | Dumesic et al. | |
| 2006/0102468 A1 | 5/2006 | Monzyk et al. | |
| 2006/0115691 A1 | 6/2006 | Hilmen et al. | |
| 2006/0127718 A1 | 6/2006 | Kurashima et al. | |
| 2006/0140852 A1 | 6/2006 | Russell et al. | |
| 2006/0234098 A1 | 10/2006 | Gur | |
| 2007/0045125 A1 | 3/2007 | Hartvigsen et al. | |
| 2007/0105013 A1 | 5/2007 | Rajh et al. | |
| 2007/0187247 A1 | 8/2007 | Lackner et al. | |
| 2007/0212584 A1 | 9/2007 | Chuang | |
| 2007/0217981 A1 | 9/2007 | Van Essendelft | |
| 2007/0256361 A1 | 11/2007 | Kindig | |
| 2008/0022593 A1 | 1/2008 | Gur et al. | |
| 2008/0060346 A1 | 3/2008 | Asen et al. | |
| 2008/0072496 A1 | 3/2008 | Yogev et al. | |
| 2008/0081227 A1 | 4/2008 | Mossman et al. | |
| 2008/0134666 A1 | 6/2008 | Kulkarni et al. | |
| 2008/0166602 A1 | 7/2008 | Bronold et al. | |
| 2008/0202341 A1 | 8/2008 | Poole et al. | |
| 2008/0223727 A1 | 9/2008 | Oloman et al. | |
| 2008/0241638 A1 | 10/2008 | McElroy et al. | |
| 2008/0245660 A1 | 10/2008 | Little et al. | |
| 2008/0245672 A1 | 10/2008 | Little et al. | |
| 2008/0248350 A1 | 10/2008 | Little et al. | |
| 2008/0292944 A1 | 11/2008 | Beckmann et al. | |
| 2009/0068502 A1 | 3/2009 | Corrigan et al. | |
| 2009/0071844 A1 | 3/2009 | Gomez | |
| 2009/0136797 A1 | 5/2009 | Ong et al. | |
| 2009/0158701 A1 | 6/2009 | Hoffmann et al. | |
| 2009/0159500 A1 | 6/2009 | Greaney et al. | |
| 2009/0159501 A1 | 6/2009 | Greaney et al. | |
| 2009/0162914 A1 | 6/2009 | Offerman et al. | |
| 2009/0169452 A1 | 7/2009 | Constantz et al. | |
| 2009/0169931 A1 | 7/2009 | Qi | |
| 2009/0188164 A1 | 7/2009 | Huang et al. | |
| 2009/0188782 A1 | 7/2009 | Genuario et al. | |
| 2009/0214902 A1 | 8/2009 | Pelman et al. | |
| 2009/0220388 A1 | 9/2009 | Monzyk et al. | |
| 2009/0294366 A1 | 12/2009 | Wright et al. | |
| 2009/0317882 A1 | 12/2009 | Cheng et al. | |
| 2010/0028241 A1 | 2/2010 | Saxena | |
| 2010/0126180 A1 | 5/2010 | Forsyth et al. | |
| 2010/0140103 A1 * | 6/2010 | Gilliam et al. | 205/637 |
| 2010/0150802 A1 | 6/2010 | Gilliam et al. | |
| 2010/0154431 A1 | 6/2010 | Genovese et al. | |
| 2010/0154639 A1 | 6/2010 | Perry et al. | |
| 2010/0180889 A1 | 7/2010 | Monzyk et al. | |
| 2010/0193370 A1 | 8/2010 | Olah et al. | |
| 2010/0200419 A1 | 8/2010 | Gilliam et al. | |
| 2010/0205856 A1 | 8/2010 | Kubic et al. | |
| 2010/0219373 A1 | 9/2010 | Seeker et al. | |
| 2010/0224503 A1 | 9/2010 | Kirk et al. | |
| 2010/0233796 A1 | 9/2010 | Kurihara et al. | |
| 2010/0300286 A1 | 12/2010 | Gu et al. | |
| 2010/0300894 A1 | 12/2010 | Lin et al. | |
| 2010/0319534 A1 | 12/2010 | Currier et al. | |
| 2011/0014526 A1 | 1/2011 | Gur | |
| 2011/0020208 A1 | 1/2011 | Aines et al. | |
| 2011/0186441 A1 * | 8/2011 | LaFrancois et al. | 205/555 |
| 2011/0277670 A1 | 11/2011 | Self et al. | |

FOREIGN PATENT DOCUMENTS

| | | |
|---|---|---|
| EP | 0 772 205 | 12/1999 |
| EP | 0 831 205 | 5/2004 |
| EP | 1 699 545 | 10/2008 |
| EP | 2 023 066 | 2/2009 |
| GB | 1293963 | 10/1972 |
| WO | WO 91/10617 | 7/1991 |
| WO | WO 92/22680 | 12/1992 |
| WO | WO 93/16216 | 8/1993 |
| WO | WO 9316216 A1 * | 8/1993 |
| WO | WO 94/04258 | 3/1994 |

(56) References Cited

FOREIGN PATENT DOCUMENTS

| WO | WO 99/00178 | 1/1999 |
|----|-------------|--------|
| WO | WO 00/28610 | 5/2000 |
| WO | WO 03/066779 | 8/2003 |
| WO | WO 2006/113674 | 10/2006 |
| WO | WO 2007/067626 | 6/2007 |
| WO | WO 2007/110657 | 10/2007 |
| WO | WO 2007/131229 | 11/2007 |
| WO | WO 2007/134075 | 11/2007 |
| WO | WO 2007/140544 | 12/2007 |
| WO | WO 2008/151060 | 12/2008 |
| WO | WO 2010/022399 | 2/2010 |
| WO | WO 2010/044113 | 4/2010 |
| WO | WO 2010/068994 | 6/2010 |
| WO | WO 2010/088054 | 8/2010 |
| WO | WO 2010096891 A1 * | 9/2010 |
| WO | WO 2011/010109 | 1/2011 |
| WO | WO 2011/014277 | 2/2011 |

OTHER PUBLICATIONS

PCT/US2013/022794 Written Opin, Mar. 28, 2013, Battle Memorial Institute.
PCT/US2013/022794 IPRP, Jul. 29, 2014, Battelle Memorial Institute.

* cited by examiner

SEPARATION AND/OR SEQUESTRATION APPARATUS AND METHODS

CROSS REFERENCE TO RELATED APPLICATION

This application claims priority to U.S. Provisional Patent Application No. 61/589,704 which was filed on Jan. 23, 2012, the entirety of which is incorporated by reference herein.

STATEMENT AS TO RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates to the separation of components from a stream of different components. The stream can be combustion effluent which can include $CO_2$ for example, and the apparatus and methods can be used to separate and/or sequester $CO_2$.

BACKGROUND

Environmental policy has dictated that certain components of combustion effluents be regulated and their discharge into the atmosphere be reduced. Example effluents include but are not limited to $SO_x$ and $NO_x$. Recently, environmental public policy considerations have dictated that the current or expanding amounts of $CO_2$ exhaust into the atmosphere should be limited or eliminated as well. As $CO_2$ is a major product of combustion, and combustion is typically an essential method for creating energy and meeting the world's energy demands, the focus of limiting $CO_2$ emissions has been on combustion processes such as coal combustion, particularly, flue gas from coal combustion. Flue gas typically contains coal combustion products which include components such as sulfur, nitrogen, and carbon, as well as oxides of same, including $CO_2$. The present disclosure provides apparatus and methods for separating the $CO_2$ from the other flue gas components and post separation, the sequestration of the $CO_2$.

SUMMARY OF DISCLOSURE

Apparatus for separating $CO_2$ from an electrolyte solution are provided. Example apparatus can include: a vessel defining an interior volume and configured to house an electrolyte solution; an input conduit in fluid communication with the interior volume and configured to convey the electrolyte solution to the interior volume; an output conduit in fluid communication with the interior volume and configured to convey the electrolyte solution outside the interior volume; an exhaust conduit in fluid communication with the interior volume; and an anode located within the interior volume and configured to provide hydrogen to the electrolyte solution within the vessel.

Other example apparatus can include: an elongated vessel defining an interior volume and configured to house an electrolyte solution, the vessel having two regions, each of the two regions associated with an opposing terminal end of the vessel; an input conduit extending outwardly from a wall of the one region of the vessel and in fluid communication with one of the two regions and configured to convey the electrolyte solution to the one region; an output conduit extending outwardly from a wall of the other region of the vessel and in fluid communication with the other of the two regions and configured to convey the electrolyte solution outside the other region; an exhaust conduit in fluid communication with the one region; and an anode located within the one region and configured to provide hydrogen to the electrolyte solution within the vessel.

Methods for separating $CO_2$ from an electrolyte solution are provided. Example methods can include: providing a $CO_2$ rich electrolyte solution to a vessel containing an anode; and distributing hydrogen from the anode to acidify the electrolyte solution and evolve at least some of the $CO_2$ from the electrolyte solution to outside the vessel.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
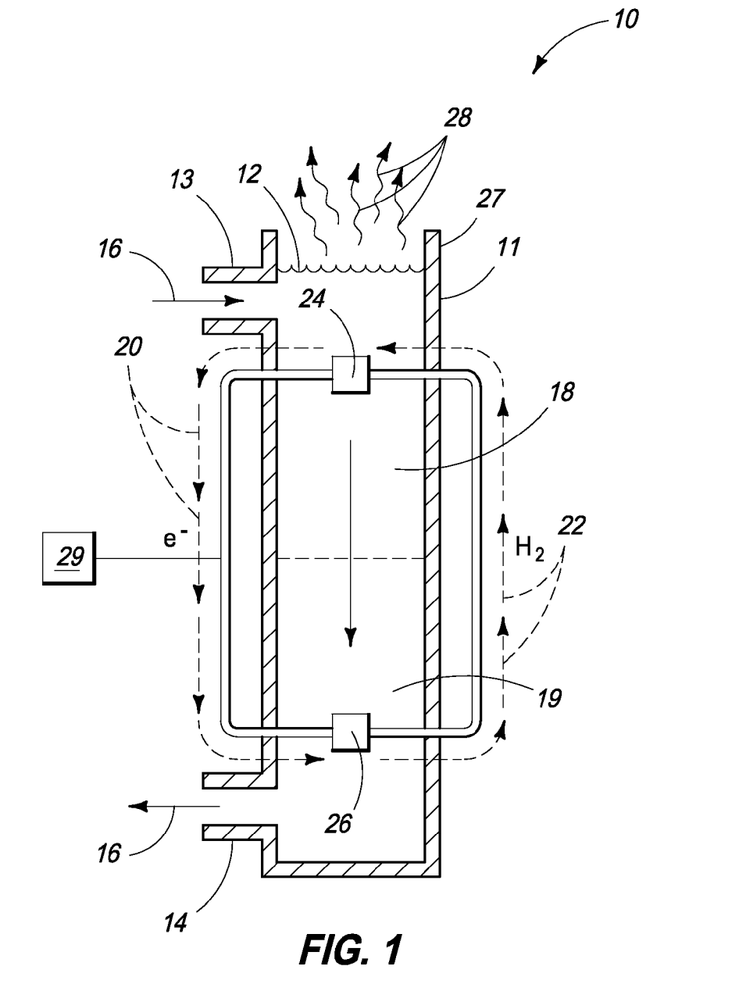
FIG. 1 is a separation apparatus according to an embodiment.

The separation and/or sequestration apparatus and/or methods of the present disclosure are described with reference to FIGS. 1-9. Referring first to FIG. 1, assembly 10 is provided that includes housing 11 containing a solution 12. Housing 11 can be an inert housing such as stainless steel, for example, and be of sufficient composition to avoid corrosion as it would be exposed to solutions having both acidic and caustic pH's. Housing 11 can define a vessel having an interior volume and configured to house solution 12. The vessel can be elongated and have opposing terminal ends.

Solution 12 within assembly 10 can be considered an electrolyte solution and can be primarily aqueous in nature. Solution 12 can have a high salt concentration sufficient to minimize ohmic losses due to ionic conduction between an anode and/or cathode within assembly 10. This salt concentration can range between from about 1 molar to about 10 molar. The electrolyte can be prepared from many salts such as potassium, sodium, barium, calcium, lithium, and/or magnesium, salts and chloride, sulfate, fluoride, iodide, phosphate, and/or nitrate, for example. Housing 11 can be arranged in a substantially normal relation to the horizontal plane, thereby taking advantage of gravitational effects, for example. In other arrangements a pressure differential may be established between entry and outlet by situating one or more pumps at the entry or outlets to establish a pressure differential through the vessel and/or across regions of the vessel.

In accordance with example implementations, a fluid flow 16 can be directed at the upper portion of assembly 12 via conduit 13, and this fluid flow can be directed through housing 11 and exiting the lower portion via conduit 14. Conduit 13 can be considered an input conduit in fluid communication with the interior volume of the vessel. Conduit 13 can be configured to convey the electrolyte solution to the interior volume. Conduit 13 can extend outwardly from a wall of housing 11. Conduit 14 can be considered an output conduit in fluid communication with the interior volume of the vessel. Conduit 14 can be configured to convey the electrolyte solution outside the interior volume. Conduit 14 can extend outwardly from a wall of housing 11. In accordance with example implementations, fluid 16 entering conduit 13 can include a particular effluent component having a form consistent with a proton deficient or basic aqueous environment. Example components include $SO_x$, $NO_x$, and $CO_2$. With regard to a specific system, the effluent component to be separated can include $CO_2$ having the form $HCO_3^-$ and/or $H_2CO_3$ in a proton deficient environment, for example. In a proton rich or acidic environment $CO_2$ can take the form of $CO_2$ gas for example.

With reference to FIG. 1 and for example purposes only, regions of assembly 10 have been identified as region 18 and region 19. Region 18 can be considered an upper region of assembly 10, and region 19 can be considered a lower region of assembly 10. For purposes of explanation these regions are depicted as separated by a dashed line. However, the interface between these regions should not be considered to be so clear as this partition is for explanation purposes only. In accordance with example embodiments, the vessel can have two regions. Each of the two regions can be associated with a different opposing terminal end of the vessel. The input conduit can be in fluid communication with one region, region 18 for example, and configured to convey electrolyte solution to the one region. The output conduit can be in fluid communication with the other region, region 19 for example, and configured to convey electrolyte solution outside the other region. Region 18 can be considered the proton rich or acidic region of assembly 10, and region 19 can be considered the proton deficient or basic region of assembly 10.

In accordance with an example aspect of the disclosure, the $CO_2$ in a proton deficient or basic medium ($2HCO_3^-$) can enter assembly 10, and be exposed to the media of region 18 containing anode 24. Anode 24 can be located within the interior volume of the vessel and configured to provide hydrogen to the electrolytic solution within the vessel. Anode 24 can be located in region 18 for example.

Anode 24 can be supplied with hydrogen in the form of hydrogen gas ($H_2$). The anode can be configured as a gas diffusion type electrode with $H_2$ exposed on one side, and electrolyte solution 12 on the other side. It can be a thin shell of electrode material of any desirable shape, for example. It can be configured to facilitate oxidation of $H_2$ at a low electrochemical overpotential. Anode 24 can be configured as a bubbler. The flooding of anode 24 by solution 12 is to be avoided.

Anode 24 of region 18 provides protons to this region through the electrochemical conversion of $H_2$ to acid $H^+$ which is then available in the aqueous media to react with proton deficient form of the effluent and form $CO_2$ gas, for example. The configuration of anode 24 can be varied. In one configuration anode 24 can be a planar gas diffusion electrode with $H_2$ on one side and solution on the other. It may be a single sheet, a folded or fluted sheet, or a series of stacked sheets as well. Specific to gas diffusion electrode is the prevention of flooding of the planar sheet by solution. Further, anode 24 may consist of many separate electrode structures. An assembly of anodes may be used that are electrically connected in parallel or in series, for example. Solution within region 18 may flow from one anode to the next, in series, or be fed individually to each electrode in parallel. $CO_2$ evolution may occur at the electrode surface, near the surface or distant from the electrodes, possibly in a separate chamber, provided that the majority of $CO_2$ gas is not swept to the cathode. Structures, such as rough surfaces, devices, such as ultrasonic horns, or chemicals may be introduced to enhance nucleation and evolution of $CO_2$ gas upon formation.

More particularly, within region 18, the following formula is an example of the form of both water and reduced carbon dioxide:

$$H_2 + 2HCO_3^- \rightarrow CO_2(g) + 2H_2O + 2e^-$$

In this form, $CO_2$ is in a gas phase, and thereby can evolve from assembly 10 as gas 28. As $CO_2$ is formed at anode 24, electrons are generated, and these electrons are transferred to cathode 26 in the caustic region 19 of assembly 10. The vessel may also include an exhaust conduit 27 in fluid communication with the interior volume of the vessel. In accordance with example embodiments, conduit 27 can be in fluid communication with the one region, region 18 for example, and/or proximate anode 24.

In accordance with example implementations, as fluid 16 transitions through assembly 10, it transitions through region 18 on to region 19. Region 19 is maintained as proton deficient or basic region thereby transitioning the media from an acidic form to a basic form.

Cathode 26 can be configured to produce hydrogen from solution 12 exposed thereto. Cathode 26 can be within the electrolytic solution and/or proximate conduit 14 and/or within region 19. In accordance with example implementations, the cathode can be located within the interior volume of the vessel. Cathode 26 can be configured to receive electrons and produce hydrogen.

In accordance with example implementations, this solution 12 can be depleted of $CO_2$ which in turn can cause the solution to become more caustic. Cathode 22 can be configured to efficiently capture the $H_2$ created. For example, cathode 22 can include a cap configured to capture and direct the $H_2$ created to a storage chamber or directly to anode 24. Solution flowing from the anode that is depleted of $CO_2$ load is made more basic at the cathode. Anode 24 can be operatively coupled to cathode 26 and configured to receive hydrogen from the cathode. Cathode 26 can be operatively coupled to the anode and configured to receive electrons from the anode.

The cathode should efficiently produce $H_2$ gas and capture that gas for delivery to the anode. Delivery may be by a suitable storage chamber or immediately made available to the anode. Solution flowing across the cathode will become more basic and can be made available to another vessel such as an absorber where an effluent component may be absorbed into solution.

As with the anode the cathode may have many configurations as a single electrode or an assembly of electrodes connected in parallel or in series. The basic solution of region 19 can be delivered to the absorber or alternatively the absorption process could be integrated into the cathode. Addition of all or some portion of the exit stream to the cathode flow stream can be used to reduce the pH at the cathode and thereby reduce the voltage needed to drive the electrochemical circuit. The electrode design should efficiently capture the evolved $H_2$ gas and prevent its dilution with $CO_2$ or other effluents within the media.

In accordance with example implementations, solution 12 can flow by cathode 26 as it proceeds to exit conduit 14 as a basic water solution. In accordance with example implementations, both anode 24 can be coupled to cathode 26 via a conductive material to transfer electrons. This conductive material can have power source 29 there between to facilitate the transfer of electrons, for example. In accordance with other implementations, cathode 26 can be coupled to anode 24 via conduit to transfer hydrogen in the form of gas.

Figure 1B:
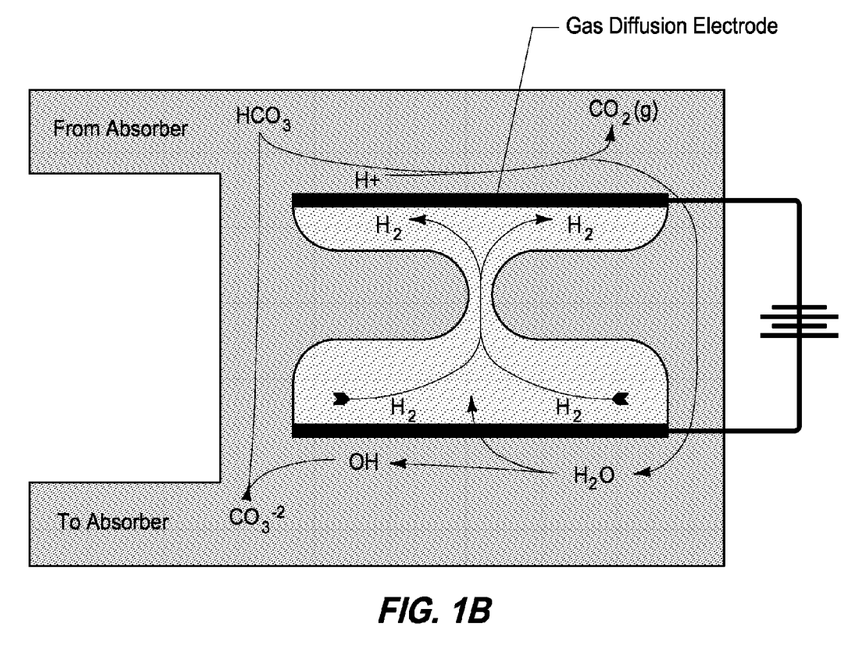
FIG. 1B is the separation apparatus of FIG. 1 detailing the flow of components in accordance with an example configuration.

Referring to FIG. 1B, an example of flow of components of the effluent and the system is shown with particular emphasis on $CO_2$ as an effluent component to be removed and/or sequestered. In accordance with this figure, $HCO_3$ can be received from an absorber and exposed to a proton rich environment provided by an anode producing $H^+$. In this region, $CO_2$ gas is produced and removed from the system. The solution received from the absorber can then proceed past the cathode where $H^+$ is removed from the solution to create a proton deficient or basic environment. The protons from this solution can be transferred to the anode and this solution can be utilized to absorb effluent components.

In a system for $CO_2$ separation/sequestration, the solution entering the chamber may contain dissolved $CO_2$ in a variety of soluble forms including $CO_2(aq)$, $HCO_3^-$ and $CO_2^{--}$ but $HCO_3^-$ will be the dominant chemical species. At the anode an unspecified fraction will be converted to $CO_2$ gas and the remainder transferred to the cathode where some or most of the remaining $HCO_3^-$ is converted to $CO_2^{--}$. In the absorber $CO_2$ is absorbed causing the solution to become more acidic and cause $HCO_3^-$ to dominate at the solution exit to an absorber, for example.

The addition of $CO_2$ gas or acid or base at the anode and cathode respectively will cause a shift in $CO_2$ soluble species and in the ability of the solution to absorb or evolve $CO_2$ gas.

In one illustrative embodiment, sufficient acid is added at the anode to drive the solution predominately to $CO_2(aq)$ and most of the dissolved $CO_2$ from the absorber is captured as gas at the anode. Such a solution will have a pH below about 6.5. Base added at the cathode can drive the pH as high as 13 or 14. Absorption of flue gas $CO_2$ will then drive the pH down below approximately 10.

Alternatively, if sufficient acid is added at the anode to convert only half the $CO_2$ load to $CO_2(aq)$ which is then released as $CO_2$ gas, the pH will drop to only 7 to 8. However, addition of base at the cathode will cause the pH to rise to near 10 to 11. Thus the pH swing in this version is much less and the applied voltage may be reduced with subsequent reduction in power costs. However less $CO_2$ is captured compared to the first embodiment.

The system should be operated to minimize the amount of power and pumping energy required per unit of $CO_2$ gas captured.

Figure 2:
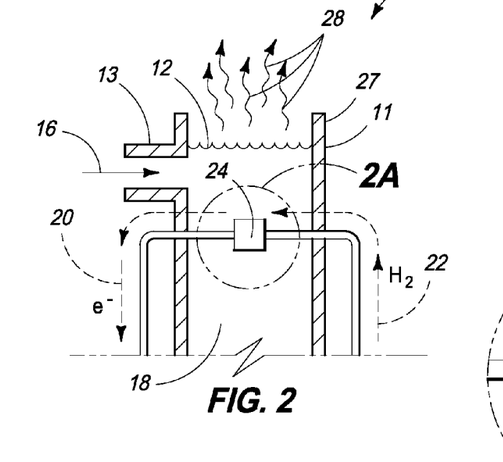
FIGS. 2 and 2A are portions of the separation apparatus of FIG. 1 according to an embodiment.
Figure 2A:
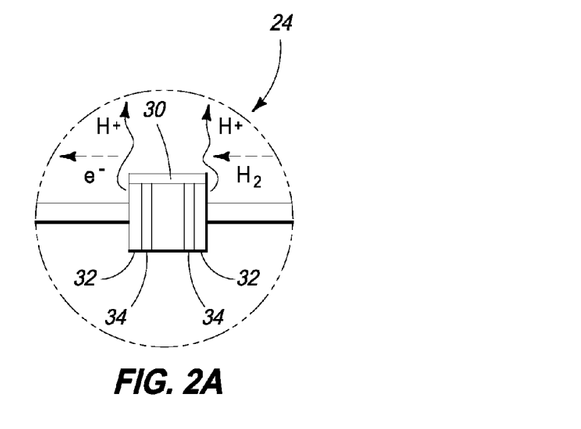

Referring to FIGS. 2 and 2A, for example, anode 24 is described in more detail. Anode 24 can include an impermeable cap 30. Anode 24 can include metal support 34 within an exterior defined by a catalyzed carbon electrode 32 configured to generate $H^+$ ions at its outer surface. The pore size of this carbon electrode can be from 0.5 to 1 μm and the interior of which can be configured to receive $H_2$ gas.

Figure 3:
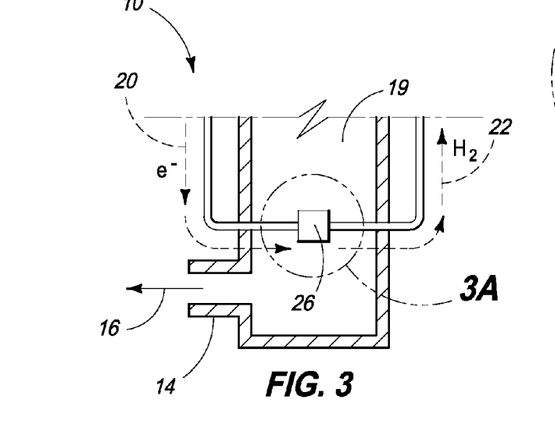
FIGS. 3 and 3A are portions of the separation apparatus of FIG. 1 according to an embodiment.
Figure 3A:
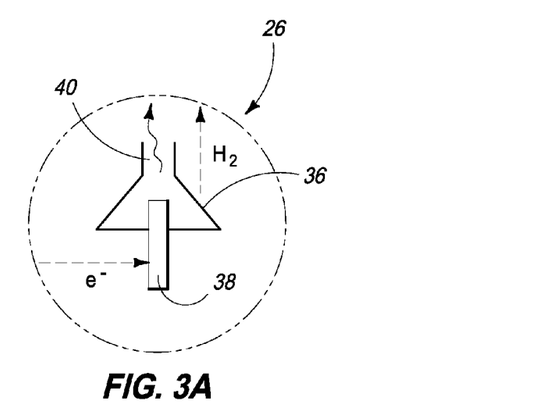

Referring to FIGS. 3 and 3A, a more detailed view of cathode 26 is shown. In accordance with example implementations, electrons can be provided to a platinum support 38 which is at least partially immersed in electrolyte solution containing water. Upon exposure of the platinum support 38 to electrons and water; $H_2$ gas 40 can be generated and captured within assembly 36. In accordance with example implementations, the conversion of these materials is shown below:

Gas transfer between the cathode and anode can occur by many methods, including storage or direct transfer. In accordance with example implementations, an intermediate storage reservoir can be configured to couple to assembly 10 and accumulate $H_2$ from the cathode and deliver $H_2$ at the anode as desired. In accordance with example implementations, the reservoir may have the advantage that $H_2$ flow could be regulated more precisely.

Physical arrangement of the anode and cathode may be such that the ionic pathway through solution 12 as it migrates through regions 18 and 19 can be limited. For example, the physical proximity of the anode and cathode can be optimized to achieve efficient $H_2$ transfer while allowing efficient $CO_2$ separation.

Figure 4:
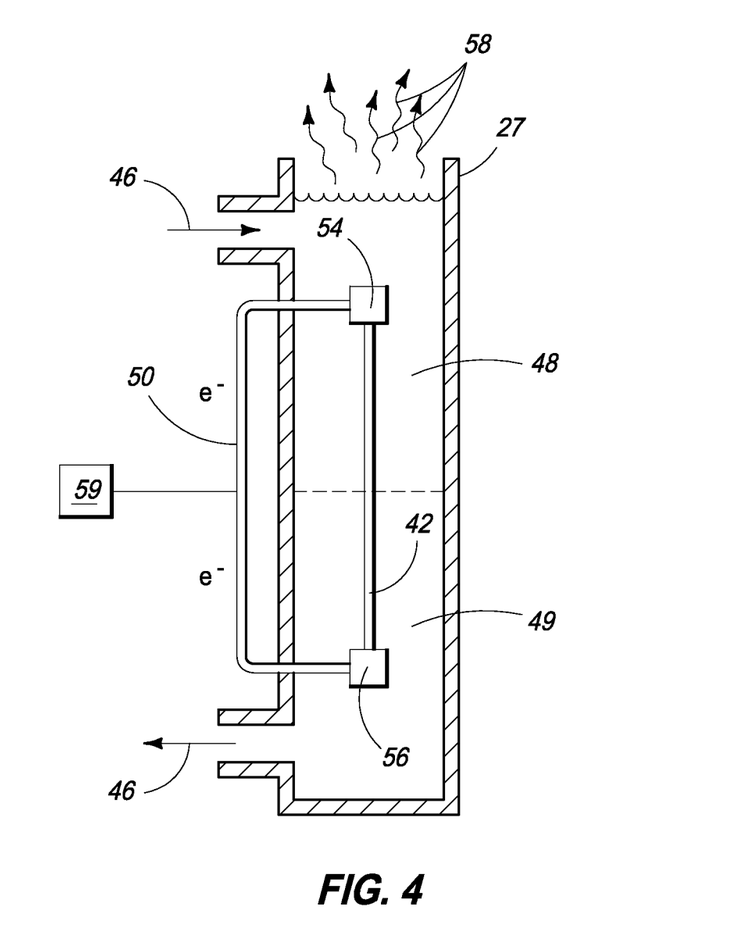
FIG. 4 is an alternative embodiment of a separation apparatus according to an embodiment.

Referring to FIG. 4, in accordance with an alternative embodiment, solution 46 is exposed to anode 54 which traverses regions 48 and 49 through assembly 40 and is then exposed to cathode 56. In accordance with example implementations, electrons are provided from anode 54 and cathode 56 via conductive element 50, which can further be coupled to power source 59. In accordance with another embodiment, hydrogen can be transferred between cathode 56 and anode 54 via conduit 42. Conduit 42 can reside within the volume defined by assembly 40.

As noted above the anode and cathode may have a variety of configurations. Further the anode and cathode assemblies may be separated by an intervening flow chamber for the solution as well as the connecting conduit for transfer of $H_2$ gas. Alternatively they may be closely integrated such that $H_2$ created at the cathode is immediately available for use at the anode. Electrical connection between anode and cathode may be in series or in parallel in a manner partially dependent on the configurations of each anode and cathode assembly.

It is desirable to have $CO_2$ removal 28 from assembly 10 be sufficient from solution 12 prior to that solution migrating to the bottom or towards the lower portion of assembly 10 and coming in contact with the cathode. However, while depicted in this description, it may not be possible to remove all of the $CO_2$, but some $CO_2$ remaining in the solution does not render assembly 10 or the methods inoperable.

In accordance with example implementations, a 4M KCl with 0.1M $KHCO_3$ solution can be used as the feed solution and the pH of the exiting KOH solution monitored. A pH electrode can also be used to monitor the solution near the top anode. The electrode location, and hence the interpretation of the pH value, can vary with electrode design. In some configurations, the inlet solution pH can be monitored and in other configurations, the solution above or to the side of the electrode can be monitored.

A sonicator with a horn type probe can be used in some configurations to stimulate nucleation of $CO_2$ gas. Typically the sonication can be kept on for 0.1 sec and pulsed at 10 sec intervals. Power may be varied from 100% to 20%.

The 0.1 M $KHCO_3$ solution in 4M KCl can be pumped into the assembly at about 4 ml/min. The head space above the assembly can be purged with $N_2$ at a flow of either 10 or 20 ml/min and the exhaust fed into a $CO_2$ meter. Calibration of this meter is not particularly stable or accurate and we estimate a 10 to 20% error in the measured value. In the data reported below, the $CO_2$ concentration is reported as either a direct meter reading or converted to a flow rate of moles of $CO_2$ produced per minute. To obtain a chemical efficiency this number was divided by the $KHCO_3$ inlet flow rate.

The current, I, that matches in $KHCO_3$ mass flow is given by:

$$I = n*C*S*F$$

Where C is the concentration, S if the flow rate, F is faradays constant and n is the number of electrons needed. n=1 in this case. In units of mol/liter, ml/min the equation is:

$$I = 1.6*S*C$$

and for a 0.1 M solution at 4 ml/min the equivalent current can be 0.161 A or 161 mA. These relationships can be used to express the results in terms of coulometric efficiency.

The pump used for these configurations can be a small peristaltic pump that can produce a flow rate but which was not linear or very variable. Flows can be calibrated by collecting the outlet flow during each experiment.

Figure 5:
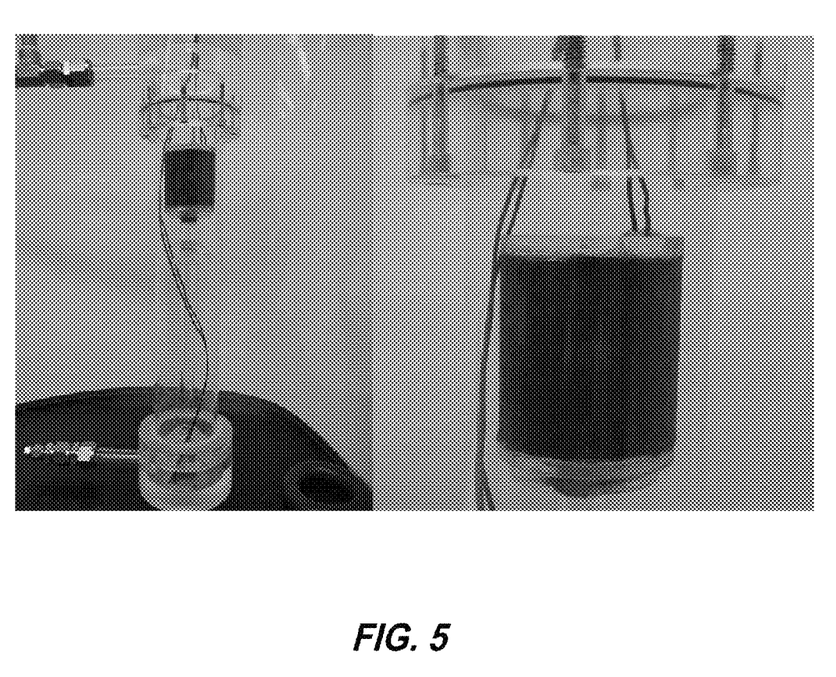
FIG. 5 depicts photographs of an example according to an experimental embodiment.

Photographs of an example assembly are shown in FIG. 5. The $KHCO_3$ solution can enter through the Swagelok port in the top left of the left picture. It then can flow down and over the anode shown in detail as the black cylinder in the right hand picture. The anode can be a hollow porous stainless steel cylinder with a platinum catalyst coating on the outside. It is here that the $CO_2$ evolutions should occur. The depleted solution can flow down to the cathode at the bottom of the reactor and out the Swagelok fittings at the bottom left. $H_2$ gas created at the bottom cathode can bubble up through the barely visible center tube and into the bottom of the hollow anode where it can be reconverted to acid on the outside. The above configuration was used to generate the data below:

Summary of Experimental Results

Exp. 1 used the basic reactor of pictured above without sonication. The results demonstrated the electrochemical functionality of the device and the primary conclusion was that at least 4M KCl was required to reduce the ohmic overpotential associated with solution conductivity and the importance of balancing the proton generation rate to the in-flow of bicarbonate solution else the pH may be insufficiently acidic to generate $CO_2$.

In Exp. 2 the stainless steel support was eliminated and a flat electrode with a flow director was utilized. In these experiments we were able to evolve significant amounts of $CO_2$ as detailed below. In certain configurations, it can be beneficial to closely direct the flow of $CO_2$ saturated solution over the acid generating electrode and that if done properly, ultrasonication may not be needed and most certainly should be kept at very low and intermittent power levels.

Figure 6:
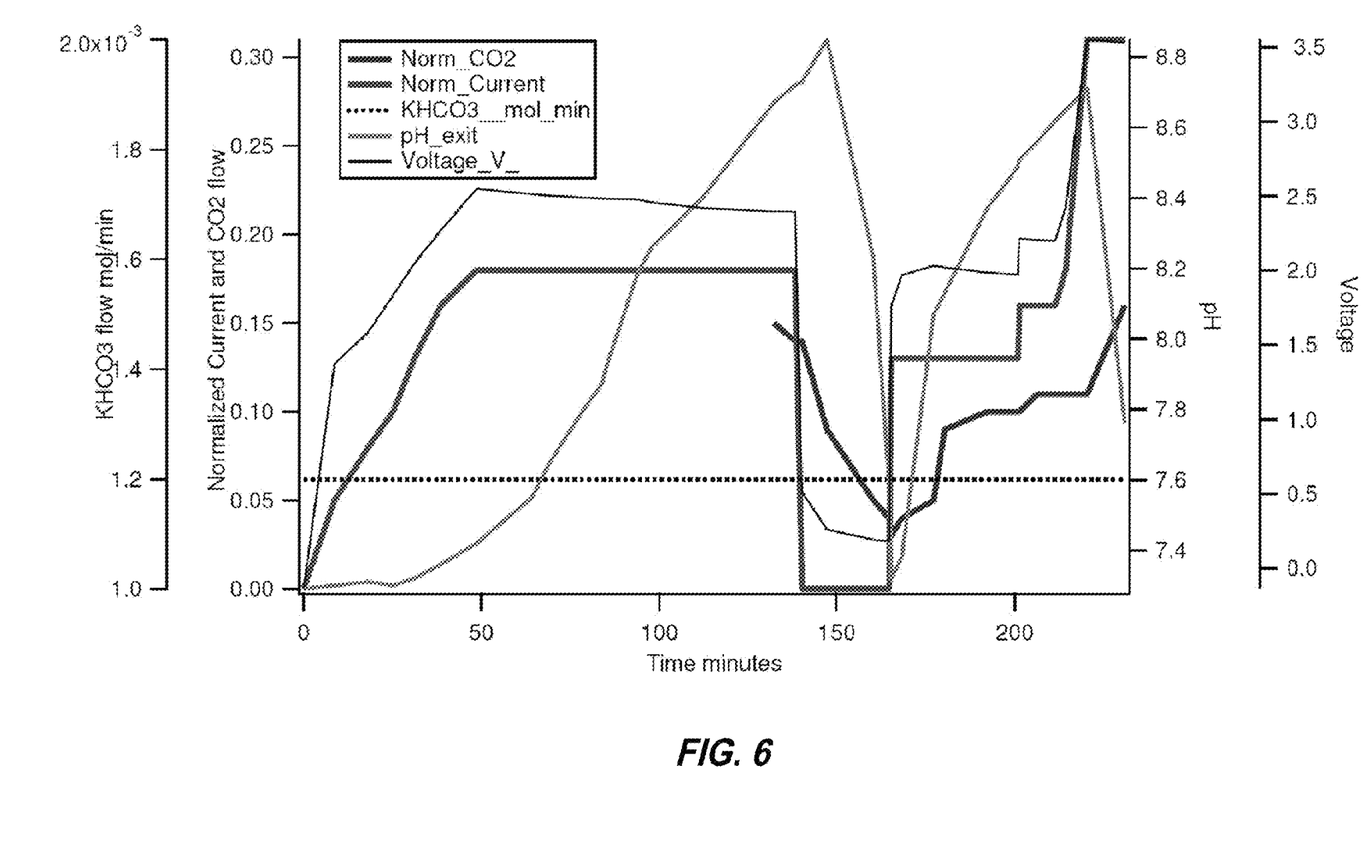
FIG. 6 depicts the results for experiment 1.

Results for Exp. 1 are shown in FIG. 6. The in-let flow was kept constant at 4 ml/min of 0.3 M $KHCO_3$ in 4M KCl. Initially the voltage and current were gradually increased and then the current held constant at 350 mA or about 18% of the $KHCO_3$ flow. The plot shows the "normalized current" which is the actual current converted to mole equivalents and divided by the $KHCO_3$ flow rate. The exit pH gradually increased to 8.8. At about 135 minutes a $CO_2$ meter was connected. The $CO_2$ flow was initially about 15% of the $KHCO_3$ flow. This is the normalized $CO_2$ flow rate. The current was then turned off and the pH and $CO_2$ flows were allowed to decay to near original values. This took about 20 minutes. The current was then turned back on and gradually the pH and $CO_2$ flow increased. This first run clearly demonstrated that $CO_2$ evolution was possible and the assembly worked. The cell did not behave in this manner in later experiments as noted below. It also appeared that $CO_2$ evolution as evidenced by effervescence came in short bursts indicating a nucleation problem.

Figure 7:
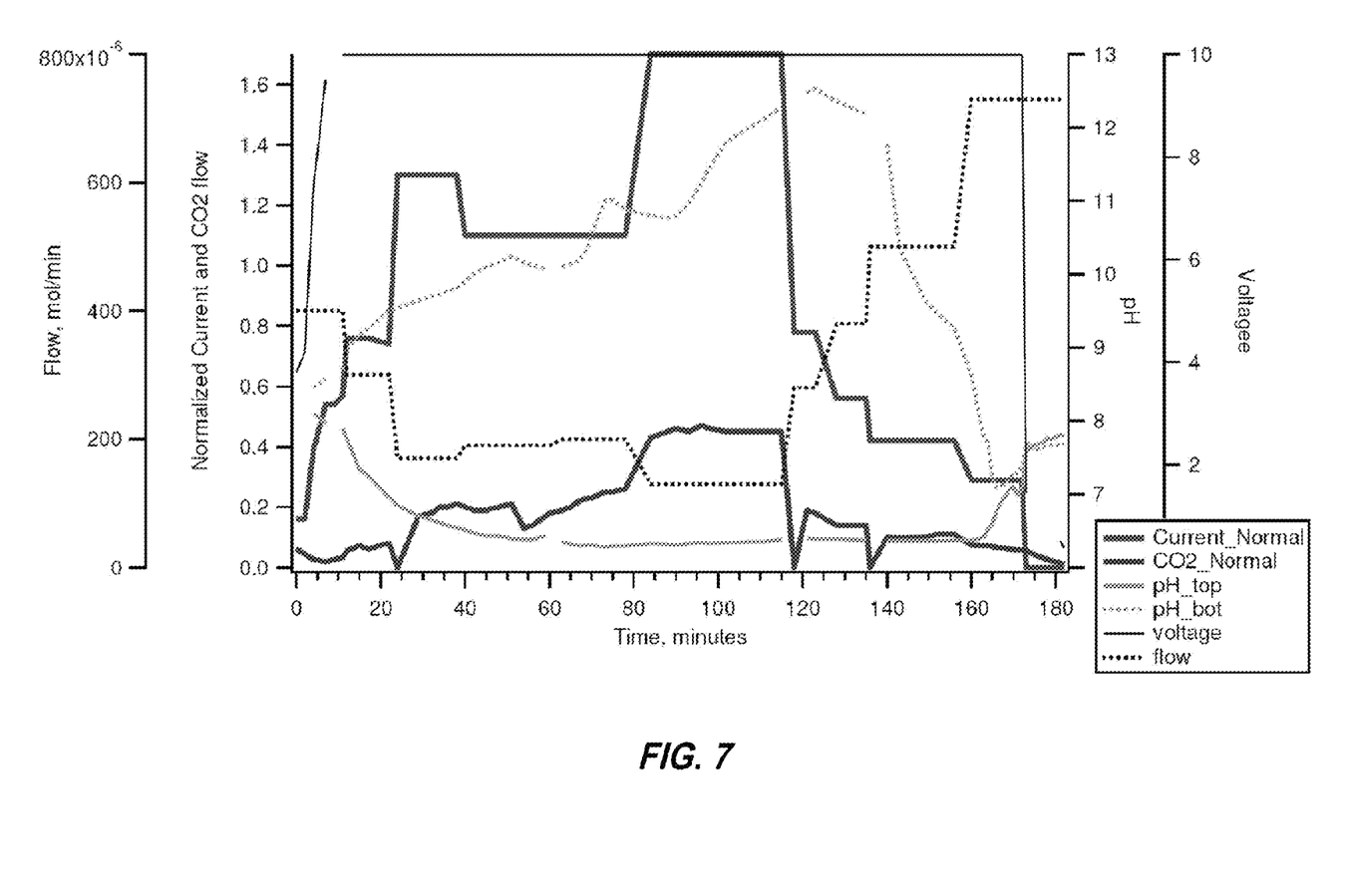
FIG. 7 depicts the results for experiment 2.

The data for Exp. 2 is shown in FIG. 7. It is a complex plot and involves considerable data reduction. First the cell current and % $CO_2$ values were converted to equivalent mass flows in mol/min and then normalized to the actual $KHCO_3$ inlet flow in mol/min. These are the thick red and blue lines respectively. Also shown is the actual $KHCO_3$ flow in mol/min (dotted black line).

Also shown is the cell voltage (solid black line) which is mostly pegged at 9.99 V as this was the limit of the instrument. Hence it was necessary to adjust inlet flows of $KHCO_3$ rather than try to adjust current. The current was for the most part kept at about 440 mA except at the beginning and end of the experiments. In comparison to the data of the first experiment described above the cell voltages are much higher. This is in part due to the restricted fluid movement which increased the ohmic resistance and to the much smaller electrode area which probably increased the overpotentials. As before electrochemical efficiency was not the focus and we were happy just to get $CO_2$ evolution.

The pH taken at the exit near the cathode (dotted green line) and near the side of the anode (solid green line) are shown. The difference between these two values defines the pH gradient.

During the first 12 minutes of the experiment the cell voltage was increased in steps to 9.99 V and about 440 mA with a $KHCO_3$ flow of 4e-3 mol/min (equivalent to 4 ml/min of 0.1 molar $KHCO_3$). While the current increased proportionately, $CO_2$ evolution remained negligible.

The $KHCO_3$ flow was then decreased until the normalized current exceeded 1.0 at which point $CO_2$ evolution began to be noticeable. It was also during this time that the pH at the top anode dropped to near 6.3 and the exit pH rose to about 10. This experiment as well as earlier results suggests that the onset of a pH gradient and concurrent $CO_2$ evolution occur when the acid generated at the anode equals or exceeds the inlet flow of $KHCO_3$. The pKa of $H_2CO_3$ is 6.35 and to form significant amounts of $CO_2$ it would be necessary to be near or below this pH. If the flow of $KHCO_3$ is greater than the acid generated then the speciation would dictate a pH higher than 6.35 and low $CO_2$ evolution rates.

To confirm this relationship the $KHCO_3$ flow was increased at the end of the experiment in an attempt to "wash out" the pH gradient. The $KHCO_3$ flow was gradually increased at a time shortly before 120 minutes. The normalized $CO_2$ rate fell sharply but the pH gradient did not begin to decrease until about 140 minutes. The pH at the anode did not change significantly until about 160 minutes. While there are significant time lags in these experiments it does appear possible to unbalance the acid generation rate with the $KHCO_3$ flow rate and cause the system to slowly shut down. The time lags are probably due to the large volumes in the reactor compared to the inlet flow and it apparently takes time to begin the $CO_2$ evolution process as well as shut it down.

Between about 25 minutes and 115 minutes the $KHCO_3$ flow was varied in an effort to maximize the $CO_2$ evolution rate. From about 30 to 80 minutes the normalized $CO_2$ flow gradually increased to about 0.3 while the normalized current was kept at 1.1. The gradual increase was attributed to the gradual increase in the pH gradient over this time although the relationship is not straightforward and the exit pH seemed to vary considerably. Various levels of ultrasonication were also tried but with no distinct impact on $CO_2$ evolution.

At about 80 minutes the flow was further decreased and the normalized current rose to 1.7 and the normalized CO₂ flow rose to nearly 0.5. These results demonstrate that about 50% of the incoming CO₂ can be captured. Thus we give this reactor a "chemical efficiency" of 50%. However the coulombic efficiency (1/1.7*100) is about 60%.

This is a successful demonstration of the feasibility of electrochemically generating pH gradients and using this to evolve CO₂ from feed solutions. A CO₂ chemical efficiency approaching 50% of the KHCO₃ flow and a coulombic efficiency of about 60% of KHCO₃ flow.

Figure 8A:
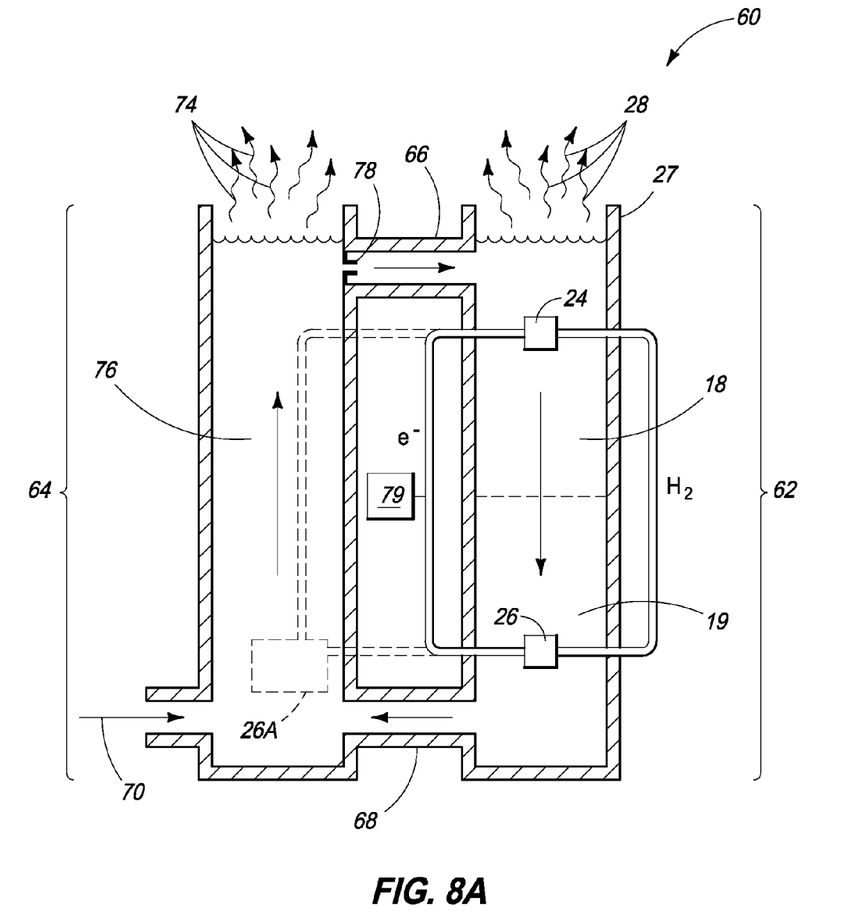
FIG. 8A is a separation apparatus according to an embodiment.
Figure 8B:
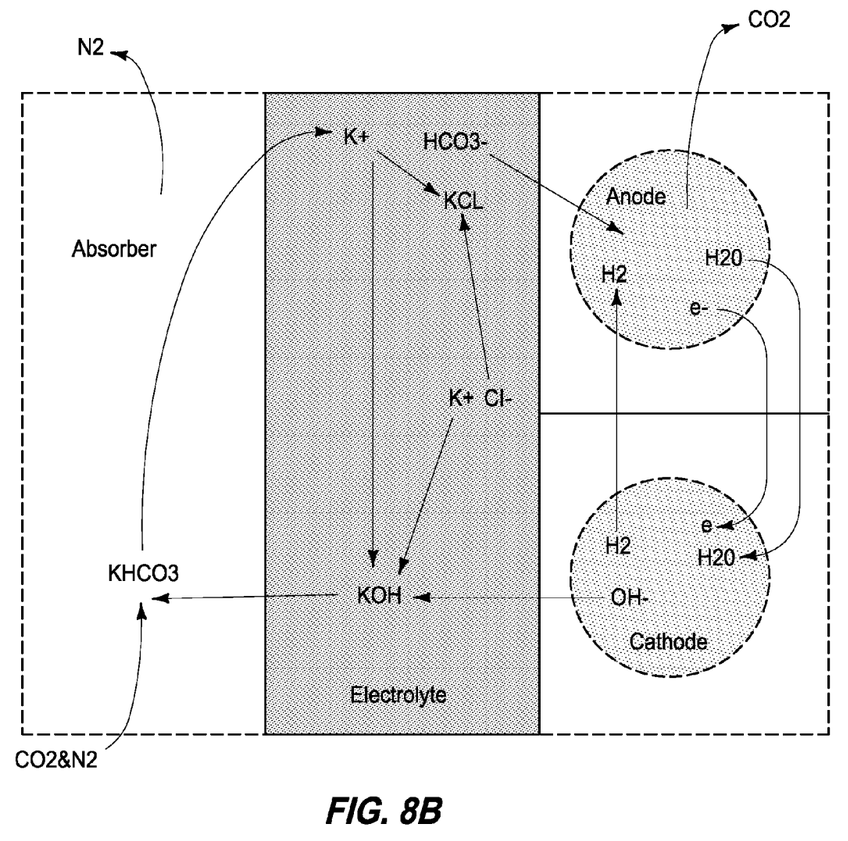
FIG. 8B is the separation apparatus of FIG. 5 detailing the flow of components in accordance with an example configuration.
Figure 9:
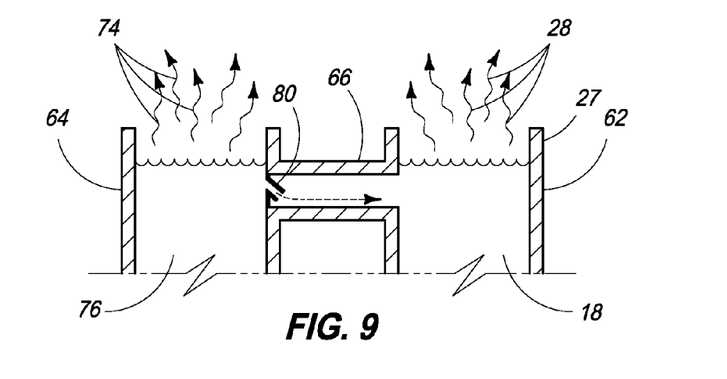
FIG. 9 is a portion of the separation apparatus of FIG. 5 according to an embodiment.

Referring to FIGS. 8 and 9, an assembly 60 is provided for treating a stream containing more than CO₂. As an example, stream 70 entering assembly 60 can contain effluent components, for example, nitrogen as well as CO₂. In accordance with example implementations, stream 70 can enter assembly 60 and migrate towards the upper portion of assembly 60 and further migrate across connective conduits 66 and 68 and pass through regions 18 and 19 of assembly 62, for example. In accordance with example implementations, assembly 60 can be described as including at least two portions: an adsorption column 64 and a CO₂ isolation column 62. Absorber 64 can be in fluid communication with one or both of the input or output conduits of the vessel. In accordance with example implementations, the absorber can be configured to expose the combustion gases to the electrolyte solution exiting the output conduit. As shown in FIG. 8, cathode 26A may also be singly placed outside the vessel and, for example, within absorber 64. Absorber 64 can be in fluid communication with both regions of the vessel.

According to an example implementation, as stream 70 can include both N₂ as well as CO₂ gas. Within column 64, solution 76 can include a caustic solution received from column 62 as described previously. In accordance with example implementations and with respect to the following formula, the CO₂ within stream 70 can be converted to a reduced form, and retained within the solution according to the following formula:

$$CO_2 + OH^- \rightarrow HCO_3^-$$

In accordance with this reaction, as basic solution is received from column 62, nitrogen gas 74 is unreacted and thereby separated as it evolves in gas form from solution 76 within the column 64. Solution 76 can continue on through interface 78 through conduit 66 to column 62. Column 62 is consistent with the reactors previously described wherein CO₂ is in its reduced form and exposed to acidic region 18 and basic region 19 that are maintained in those pH ranges via anode and cathode, respectively.

Referring to FIG. 8A a more detailed depiction of the transition of forms of the effluent is shown. As shown, effluent components CO₂ and N₂ are exposed to aqueous solution or electrolyte, wherein the solution has a proton depleted or basic state reacting to bring CO₂ into the HCO₃ or H₂CO₃ form while N₂ remains in the gas form and able to evolve from the system. As the basic form of CO₂ transitions into the next vessel it is reacted according to the previously described embodiments.

Referring to FIG. 9, an interface 80 can be provided that is angled to prevent the transfer of gaseous particles from column 64 to column 62. In accordance with example implementations, interface 80 can direct fluid via a pressure differential while allowing gaseous particle 74 to be separated from the fluid within column 64.

It can be important for other gases not to enter column 62. In accordance with other implementations, column 64 may be configured to include a reservoir that allows gas bubbles time such as nitrogen 74 to coalesce and rise to the exit chamber to further facilitate the efficient transfer of gaseous particles out of column 64 without being transferred to column 62. To facilitate the efficient evolution of CO₂ from column 62 for example, nucleation enhanced by ultrasonication or addition of carbonic hydrates or other chemical agents may facilitate the efficient evolution of CO₂. Nucleating surfaces such as rough oxide substrates or even suspended particulate materials that flow around with the solution may be utilized.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An apparatus for separating CO₂ from an electrolyte solution, the apparatus comprising:
   a vessel defining an interior volume and configured to house an electrolyte solution;
   an input conduit in fluid communication with the interior volume and configured to convey the electrolyte solution to the interior volume;
   an output conduit in fluid communication with the interior volume and configured to convey the electrolyte solution outside the interior volume;
   an exhaust conduit in fluid communication with the interior volume;
   an anode located within the interior volume and configured to provide hydrogen ions to the electrolyte solution within the vessel; and
   a cathode located within the interior volume; and further comprising
   a fluid conduit coupling the anode and the cathode, the cathode configured to provide H₂ to the fluid conduit, wherein the anode comprises a porous electrode configured to receive H₂ from the fluid conduit, and wherein the interior volume of the vessel is continuous between the cathode and the anode.

2. The apparatus of claim 1 further comprising an electron conduit between the anode and the cathode.

3. The apparatus of claim 2 wherein the cathode is located proximate the output conduit.

4. The apparatus of claim 2 wherein the cathode is configured to receive electrons from the electron conduit and generate H₂ for the fluid conduit.

5. The apparatus of claim 1 further comprising an absorber assembly in fluid communication with one or both of the input and output conduits.

6. The apparatus of claim 5 wherein the absorber assembly is configured to receive combustion gases.

7. The apparatus of claim 6 wherein the absorber assembly is configured to expose the combustion gases to the electrolyte exiting the output conduit.

8. The apparatus of claim 7 wherein the absorber assembly is configured to transfer the exposed electrolyte solution to the input conduit.

9. An apparatus for separating CO₂ from an electrolyte solution, the apparatus comprising:
   an elongated vessel defining an interior volume and configured to house an electrolyte solution, the vessel having two regions, each of the two regions associated with an opposing terminal end of the vessel;
   an input conduit extending outwardly from a wall of one of the two regions of the vessel and in fluid communication with the one of the two regions and configured to convey the electrolyte solution to the one region;

an output conduit extending outwardly from a wall of another of the two regions of the vessel and in fluid communication with the other of the two regions and configured to convey the electrolyte solution outside the other region;

an exhaust conduit in fluid communication with the one region;

an anode located within the one region and configured to provide hydrogen ions to the electrolyte solution within the vessel; and a cathode located within the other region; and further comprising a fluid conduit coupling the anode to the cathode, the cathode configured to provide $H_2$ to the fluid conduit, wherein the anode comprises a porous electrode configured to receive $H_2$ from the fluid conduit, and wherein the interior volume of the vessel is continuous between the cathode and the anode.

10. The apparatus of claim 9 further comprising one or more pumps coupled to one or both of the input conduit and/or the output conduit.

11. The apparatus of claim 9 further comprising an absorber in fluid communication with both regions of the vessel.

12. The apparatus of claim 11 wherein the absorber and vessel are configured to cycle the electrolyte solution through the absorber and through the vessel passing through the one region before the other region.

13. The apparatus of claim 9 wherein some of the electrolyte solution in the one region is acidic and some of the electrolyte solution in the other region is basic.

14. A method for separating $CO_2$ from an electrolyte solution, the method comprising:

providing a $CO_2$ rich electrolyte solution to a vessel containing an anode;

within the vessel, distributing hydrogen ions from the anode to acidify the electrolyte solution and evolve at least some of the $CO_2$ from the electrolyte solution to outside the vessel;

after evolving at least some of the $CO_2$ from the electrolyte solution, exposing the electrolyte solution to a cathode within the vessel; and providing $H_2$ from the cathode to the anode.

15. The method of claim 14 further comprising generating electrons from the anode and transferring the electrons to the cathode.

16. The method of claim 14 further comprising exposing an electrolyte solution to combustion gases to form the $CO_2$ rich electrolyte solution.

17. The method of claim 16 wherein the electrolyte solution is regenerated in the vessel.

18. The method of claim 17 further comprising cycling the electrolyte solution through the absorber and the vessel to absorb $CO_2$ from the combustion gases and evolve the $CO_2$ from the vessel.

* * * * *

UNITED STATES PATENT AND TRADEMARK OFFICE
CERTIFICATE OF CORRECTION

| | | |
|---|---|---|
| PATENT NO. | : 8,945,368 B2 | Page 1 of 1 |
| APPLICATION NO. | : 13/748463 | |
| DATED | : February 3, 2015 | |
| INVENTOR(S) | : Peter C. Ricke et al. | |

It is certified that error appears in the above-identified patent and that said Letters Patent is hereby corrected as shown below:

Title Page 2

Column 1, Item (56) References Cited – Replace "3,515,513 A   6/1970   Parsl" with --3,515,513 A   6/1970   Parsi--

In the Specification

Column 7, line 11 – Replace "S if the" with --S is the--

Signed and Sealed this
Fifth Day of April, 2016

Michelle K. Lee
*Director of the United States Patent and Trademark Office*